United States Patent [19]

Gunther et al.

[11] 4,246,434
[45] Jan. 20, 1981

[54] WORK SUPPORT FOR VACUUM ELECTRIC FURNACES

[75] Inventors: Rush B. Gunther, Abington; Prem C. Jindal, Feasterville, both of Pa.

[73] Assignee: Abar Corporation, Feasterville, Pa.

[21] Appl. No.: 971,483

[22] Filed: Dec. 20, 1978

[51] Int. Cl.³ .............................................. F27D 3/02
[52] U.S. Cl. .......................................... 13/20; 13/25; 219/390
[58] Field of Search .............. 13/32, 20, 25; 174/2 V; 219/390

[56] References Cited

U.S. PATENT DOCUMENTS

| | | |
|---|---|---|
| 1,837,256 | 12/1931 | Egan . |
| 2,837,654 | 6/1958 | Berghaus, et al. . |
| 3,437,784 | 4/1969 | Jones et al. . |
| 3,456,935 | 7/1969 | Bornor .................. 219/390 |
| 3,650,930 | 3/1972 | Jones et al. . |
| 3,761,370 | 9/1973 | Keller . |
| 4,077,783 | 3/1978 | Honacker .................. 174/211 X |
| 4,102,637 | 7/1978 | Kreider et al. .................. 13/32 X |
| 4,124,199 | 11/1978 | Jones et al. .................. 266/88 |

OTHER PUBLICATIONS

Case Hardening, Metals Handbook, 1948, American Society for Metals, pp. 677-702.

*Primary Examiner*—Roy N. Envall, Jr.
*Attorney, Agent, or Firm*—Zachary T. Wobensmith, 2nd; Zachary T. Wobensmith, III

[57] ABSTRACT

A work support for vacuum electric furnaces is provided for furnaces in which work pieces to be processed are placed inside a vacuum electric furnace chamber which is evacuated with a mechanical pump and then backfilled with a partial pressure of gas containing nitrogen, such as nitrogen or ammonia, or a hydrocarbon such as methane, or mixtures thereof. The work pieces to be processed are electrically connected to the negative (cathode) terminal of a D.C. power supply, and insulated from the chamber wall which is connected to positive terminal of the D.C. power supply and to ground for safety. The power supply is energized and a portion of the gas is ionized. The work pieces are heated to temperatures of approximately 650° to 1100° F. for ion-nitriding or to temperatures of approximately 1650° to 1900° F. for ion carburizing. The heating is effected at least in part by the ion activity but auxiliary heating elements may be used if desired. Materials that are sputtered from the work travel in straight lines and tend to build up on work supports and cause electrical shorting. Shorting is greatly reduced in this structure by use of shields which comprise insulating discs and spacers supported from the bottom of the furnace.

6 Claims, 3 Drawing Figures

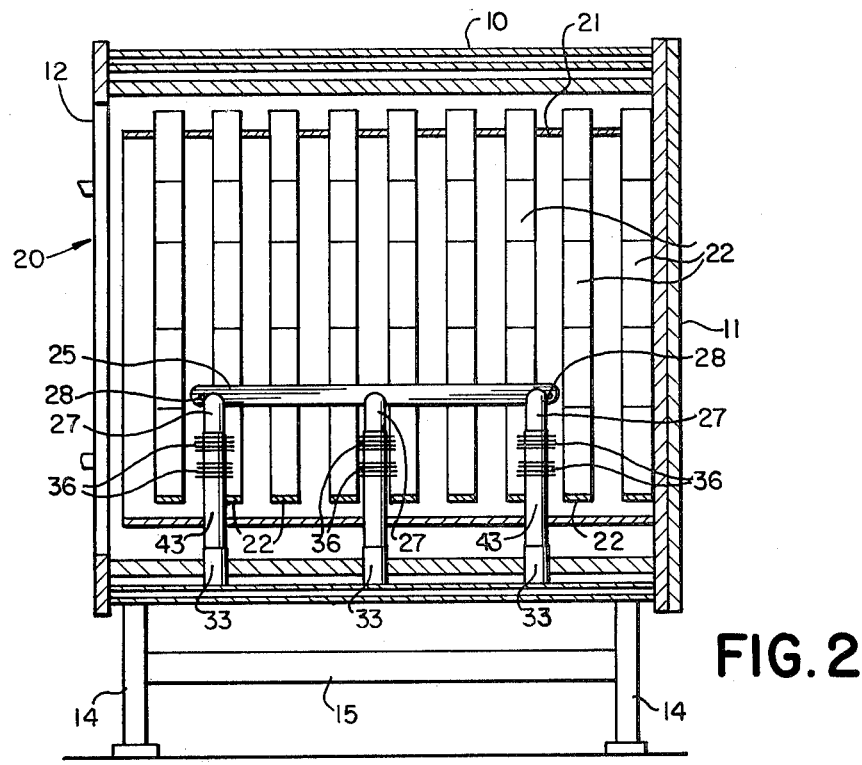
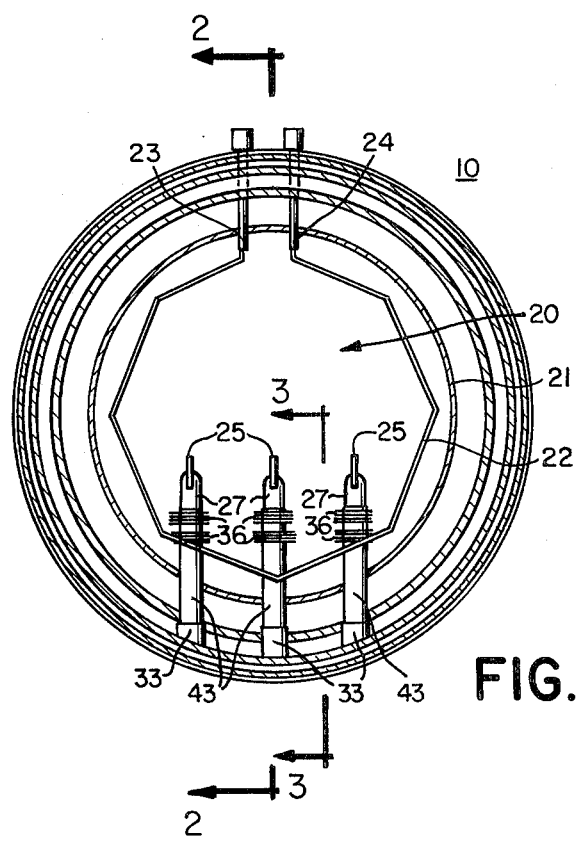

WORK SUPPORT FOR VACUUM ELECTRIC FURNACES

BACKGROUND OF THE INVENTION

1. Field of the Invention

This invention relates to work supports for vacuum electric furnaces for support of work wherein case formation in ferrous metals is provided by glow discharge on the work piece in the furnace.

2. Brief Description of the Prior Art

The process of case formation has been previously described in American Society for Metals, Metals Handbook, Vol. 2, commencing at p. 677, wherein the carburization of a surface of a ferrous work piece or ion nitriding of the surface of a work piece provides a case which may be hardened as the case is formed or which may subsequently be hardened is described.

Examples of ion nitriding by electrical discharge in a chamber of a nitrogen containing gas are shown in the U.S. Pat. Nos. to Egan, No. 1,837,256, Berghaus et al., 2,837,654, Keller, 3,761,370 and Jones et al., 3,437,784 and 3,650,930.

The prior systems were particularly subject to arcing if the power input is high, which materially decreased the effectiveness of the process.

In the U.S. Patent to Jones et al., U.S. Pat. No. 3,437,784, a power supply is shown which is intended to limit arcing by limiting the current.

In utilizing glow discharge for surface treatment in case formation, the sputtered material generated at the work piece in the previously available equipment tended to build up on the work supports causing arcing and shorting out of the electrical system.

The work support of our invention does not suffer from the problems encountered in previously available structures and has positive advantages.

SUMMARY OF THE INVENTION

In accordance with the invention a work support for use in vacuum electrical furnaces is provided wherein work pieces on which a case is to be formed are placed in a vacuum electric furnace chamber which is evacuated by a mechanical pump, and then backfilled with a partial pressure of an ionizable gas or mixture of ionizable gases. The work pieces to be processed are electrically connected to the negative terminal of a D.C. power supply and insulated from the chamber wall which is connected to the positive terminal of the D.C. power supply and grounded for safety. Energization of the power supply is effective to ionize some of the gas, the work pieces being at least partially heated by ion activity and, if desired, by auxiliary heating of the intermediate space of the vacuum chamber, to form a nitrided and/or carburized case. Material sputtered off from the work piece is prevented from deposition by shields in the form of insulated discs and spacers on the support.

It is the principal object of the invention to provide a work support for use in vacuum electric furnaces wherein case formation is obtained and wherein sputtered material build up on the work support is greatly reduced.

It is a further object of the invention to provide a work support for vacuum electric furnaces which is simple and inexpensive to construct but enjoys a long service life.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a front elevational view of a vacuum chamber and illustrating the work support of our invention, the door at the front end of the chamber being omitted;

FIG. 2 is a longitudinal sectional view taken approximately on the line 2—2 of FIG. 1.

Figure 3:
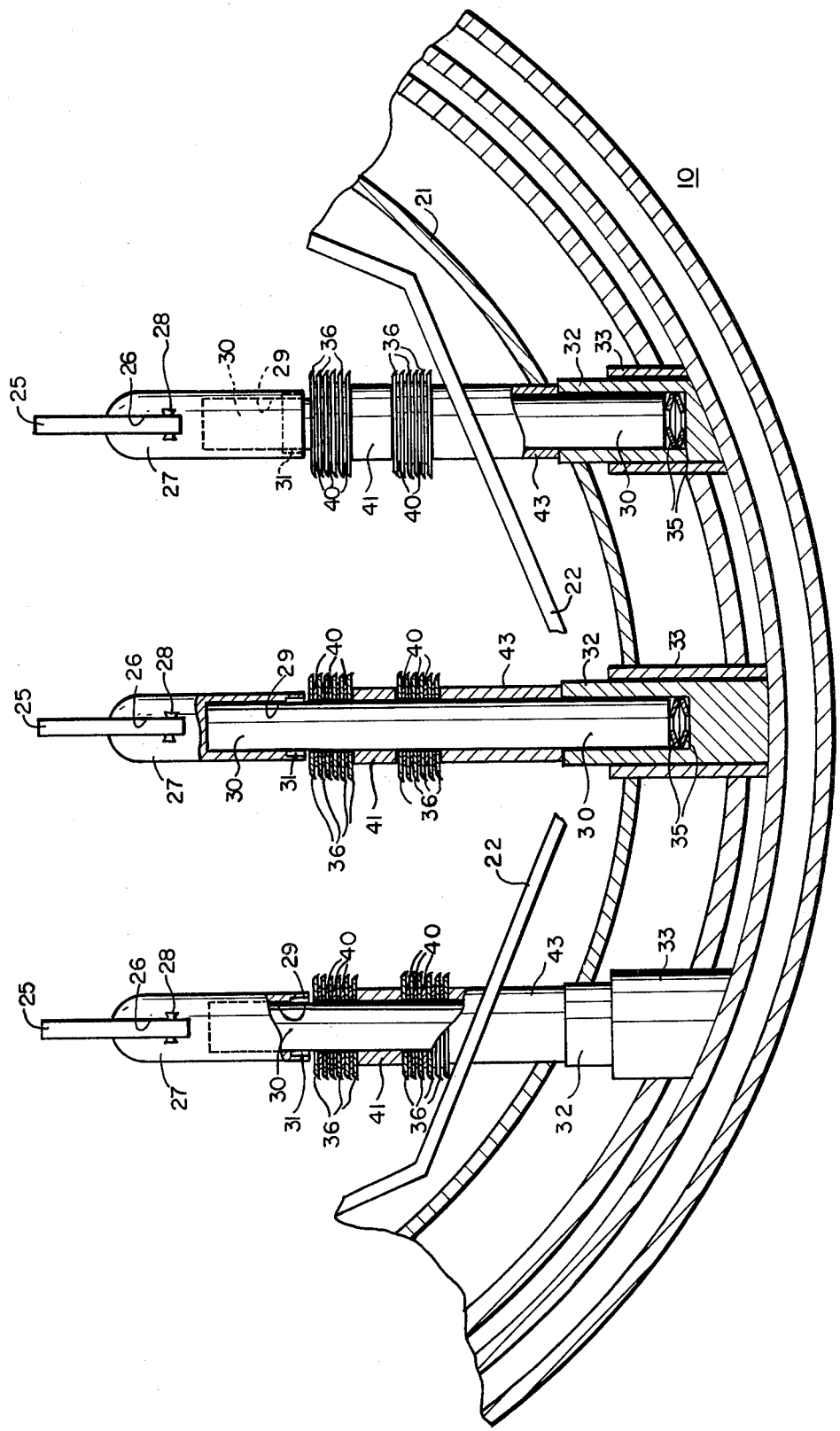
FIG. 3 is a fragmentary transverse sectional view, enlarged, taken approximately on the line 3—3 of FIG. 1.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, in which a preferred embodiment of apparatus is illustrated, a vacuum furnace of any desired type is provided, the furnace illustrated being horizontally and preferably having an outer cylindrical wall or shell 10 closed at one end in any desired manner, such as by a door or an end closure plate 11. A door (not shown) is provided, hingedly mounted on the wall 10 at the other end and movable to a closed position with respect to the front end flange 12 of the shell 10. Suitable vacuum tight packing (not shown) is interposed between the door (not shown) and the end flange 12 on the wall 10.

The shell 10 can be supported in any desired manner, such as by supports 14 with suitable intermediate bracing 15.

Suitable provisions (not shown) can be made for evacuating the furnace chamber and for providing a suitable gas or gas mixture to supply ions. One suitable apparatus for this purpose is shown in U.S. Pat. No. 4,124,199, dated Nov. 7, 1978 to William R. Jones and Prem C. Jindal.

A vacuum chamber 20 is thus provided within the shell 10, the closure wall 11 and the door (not shown).

Within the shell 10, a cylindrical ring heat shield 21 is provided for reflecting heat inwardly within the shell 10 and reducing heat leakage outwardly.

Within the shield 21, a plurality of spaced alloy metal strip type heating elements 22 are also preferably provided disposed from end to end within the chamber 20. The heating elements 22 are supported in any desired manner and are provided with conductors 23 and 24 extending through sealing bushings in the shell 10 for activation when desired.

Within the chamber 10, horizontal work supports of heat resistant metal of any suitable type are provided which include rails 25 extending lengthwise in the chamber 20. The rails 25 are carried in slots 26 in rail holders 27 and are centered by pins 28. The rail holders 27 have internal sockets 29 for engagement of vertical support rods 30, preferably ceramic rods with suitable electrical insulating properties. At the lower ends of the sockets 29, annular grooves 31 are provided to reduce the tendency of ions to deposit and bridge and electrically connect the rail holders 27 and the vertical supports 30 at this location. The annular grooves 31 prevent the glow from reaching the metal and ceramic junction.

The support rods 30 are carried in lower sockets 32, of differing lengths to compensate for the curvature of the wall 10, which in turn are carried in metal sockets 33, which are secured to the inner wall of the shell 10. The vertical support rods 30 are supported in the lower sockets 32 by opposed belleville washers 35 which, by their resiliency, permit of controlled vertical movement of the vertical support rods 30. This allows good electrical contact and uniform loading on the work support rods 30.

The support rods 30 on the exterior thereof, below the rail holders 27 are provided with spaced discs 36 preferably formed of high temperature resistant non-electrical conductive material such as mica, asbestos, or other suitable material.

The discs 36 have discs 40 of similar material therebetween of lesser diameter to provide spaces between the discs 36. The discs 36 are preferably provided in two groups, five being shown in each group with a spacer tube 41 of ceramic between the groups. The discs 36 at the perimeter thereof have downturned edges 42 which resist any collection and bridging therebetween.

The lower group of discs 36 is supported above the lower socket 32 by a ceramic tube 43.

It will be noted that the assembly and disassembly of the lower sockets 32, the support rods 30, the tubes 43, the lower and upper group of discs 36 and 40 with their spacer tube 41, and the rail holders 27 and rails 25, is relatively simple so that inspection, maintenance and replacement, as necessary, of various components can be quickly and easily carried out.

In use, and in the hostile environment in the furnace chamber 20 the spaced arrangement of the discs 36 and the groups thereof, is effective for greatly reducing the tendency to any deposits on the work supporting structure because of the line of sight shielding action of the discs 36 with respect to each other, and with respect to the tube 41 and the tube 43. The groove 31, also, by its location reduces the tendency of any deposits at this location. Load adjustment to maintain a level condition of the work piece is available because of the resilient nature of the washers 35.

We claim:

1. A work support for vacuum electric furnaces having a hostile environment therein and containing electrically conductive ions capable of deposition on objects within the furnace comprising
   electrically conductive rail members for supporting an article,
   socket members for mounting on the furnace wall,
   supporting means for a work piece interposed between the rail members and the socket members and comprising tubular members of electrical non-conducting material,
   said supporting means comprising rail holders in supporting engagement with said rail members,
   said rail holders and said rail members being of electrically conductive material,
   said supporting means comprising vertical supporting rods of electrically non-conducting material within said tubular members, and
   shielding members mounted on said vertical supporting rods for shielding lower portions of said supporting means from deposition thereon of electrically conductive materials,
   said shielding members comprising a plurality of closely spaced separable discs of electrical non-conducting material and of different diameters alternately mounted on and retained in position by said rods.
2. A work support as defined in claim 1 in which said rail members are retained on said rail holders.
3. A work support as defined in claim 1 in which said shielding members comprise an additional plurality of spaced discs spaced below said first mentioned plurality.
4. A work support as defined in claim 3 in which said supporting means each comprises a supporting rod, a tube carried on said rod between said pluralities of discs, and a tube on said supporting rod in supporting engagement with said additional plurality of discs.
5. A work support as defined in claim 1 in which said rail holders have a portion at the lower part thereof in spaced relation to said vertical supports to prevent the glow from reaching the junction of the rod and rail holder.
6. A work support as defined in claim 1 in which said socket members have resilient members therein for engagement by lower portions of said vertical supports for uniform loading on the work supporting rods.

* * * * *